United States Patent Office 3,230,656
Patented Jan. 25, 1966

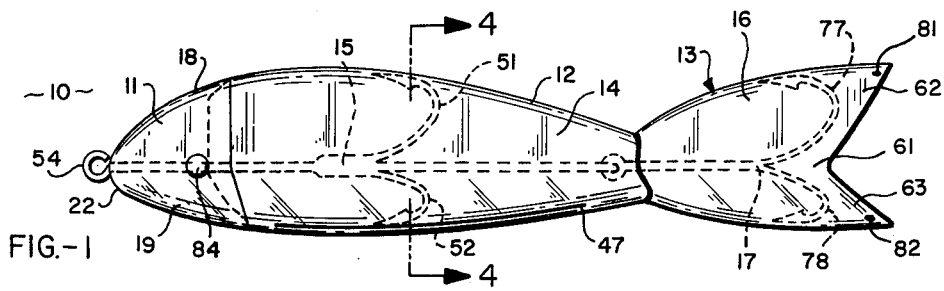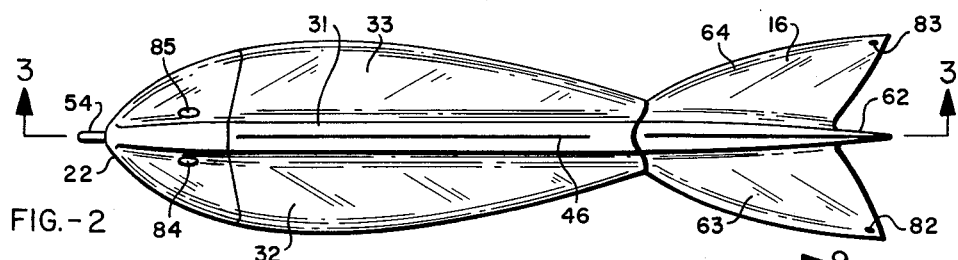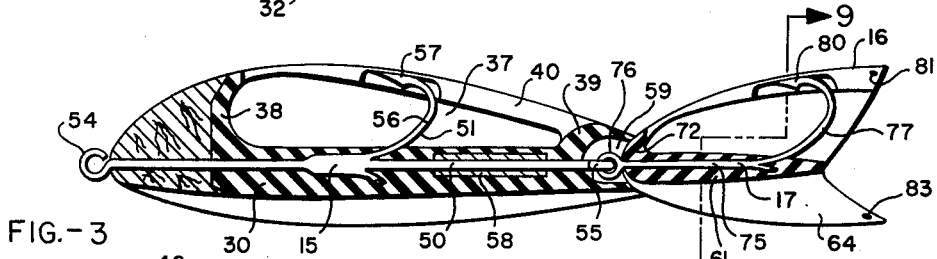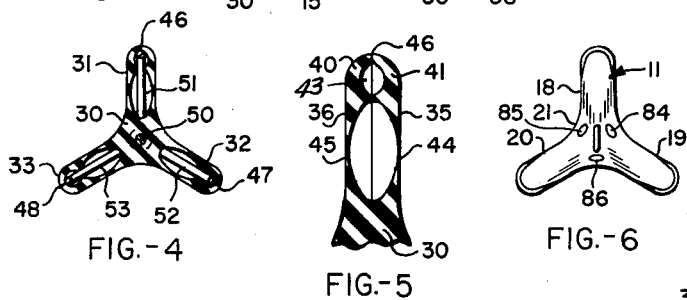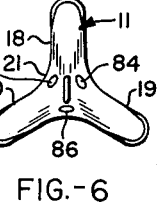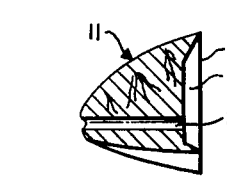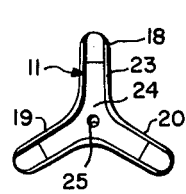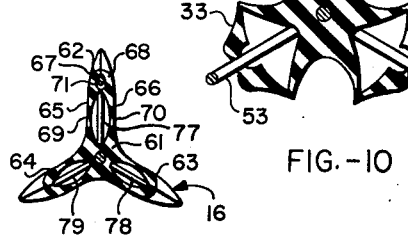

3,230,656
FISH LURE
Ivan Kozjak, 1554 E. 47th St., Cleveland, Ohio
Filed June 19, 1964, Ser. No. 376,325
10 Claims. (Cl. 43—42.1)

The present invention relates generally to fishing lures and more particularly to fishing lures which are "weedless."

One problem which has long confronted fishermen is the entanglement of their fishing hooks in weeds, algae, and other matter found in fishing waters. Weeds or other such matter caught by hooks carried by the lures prevent them from effectively performing their functions of attracting and hooking fish and oftentimes result in the loss of a lure itself.

Several so called "weedless" fishing lures already have been proposed to counteract this problem of entanglement. These prior fishing lures generally comprise structures wherein a hook and a body of the lure move relatively to expose the hook when a fish strikes. In some prior lures, the hook is spring or otherwise biased to spring out when the fish strikes the lure to thereby expose the hook and catch the fish. In other prior lures, the hooks are embedded in a rubbery mass and are supposed to stick through the mass to catch a fish when the fish strikes.

The fishing lures where the hook is biased to spring out are generally quite complicated structures which often do not work or the hooks spring out prematurely. Once the hook is out of the lure body, it is necessary to pull the lure from the water and "reload" the hook in its protected position. In addition, these prior lures are of a single hook nature and are not suitable for multiple or gang hook arrangements and certainly would not operate to expose a plurality of hooks simultaneously. Also, the rigidity of the material needed for such springing type of lures require that the lure itself be generally rigid and not simulate the rather flowing movement of a live fish. In other words, these prior lures do not act like a natural fish in the water but are rigid, stiff, and lifeless.

A problem with the embedded hook type of fishing lure is that the rubbery mass is not sufficiently fast acting to expose the hook and catch a striking fish. Often the hook is not exposed at all. Also, if the rubbery material deforms sufficiently to expose the hook, the rubbery material often does not return to its normal position and leaves the hook exposed to become entangled.

The lure of the present invention comprises generally a shank which may be tied or otherwise fastened to a fishing lure, a hook projecting from the shank and terminating in a forwardly projecting barbed tip, and a hook enclosure extending from the shank outwardly and surrounding the hook. The hook enclosure comprises a pair of thin walls of a very pliable, softly resilient material. The thin walls taper in cross section to a minimum thickness in a longitudinal extending section, midway between the innermost and outermost portions of the hook enclosure. In a preferred form, the present lure is a treble lure and has three such hooks and hook enclosures projecting radially from a center core. The three hooks and enclosures are also spaced radially in equi-angular relative positions.

Each hook enclosure further includes a pair of lips at the outermost extremities of the thin walls. The lips are normally in abutment. The outermost surfaces of the hook are disposed just below the outer surface of the lips and are concealed and protected by the lips and the thin walls. Any lateral pressure exerted against the outermost surfaces of the hook enclosure walls causes the walls to collapse readily in their extremely thin mid-section. This thin mid-section generally collapses outwardly so that the lips fall inwardly on the sides of the hook. The lip portions each further include recesses which together define a tip receiving cavity for receiving and protecting the barbed tip when the lips are in abutment.

The hook enclosure walls are elongated and are joined at their front and rearward ends to maintain the walls in their normal parallel standing relation. In other words, the connections at forward and rearward ends of the walls counteract the tendency of the thin walls to separate and even collapse at their thin mid-section.

In a preferred form of the present lure, the head of the lure is made of a material harder than the hook enclosures to effectively cover and protect the forward end of the hook enclosures so that objects striking the front of the lure as it travels through water do not cause the thin walls to collapse and deform.

A tail is pivotally connected to the body formed by the hook enclosures to complete the lure. The tail similarly has three hooks each enclosed by a hook enclosure similar to the hook enclosures of the body. The hook enclosures on the tail align with hook enclosures on the body so as to form continuous fins.

The tail and the body as made of the soft resilient material and pivotally connected are life-like and simulate the flowing movement of a live fish. The hook enclosures normally cover and protect the hooks from entanglement with weeds and the like and will not move sufficiently to expose the hook when moving through weeds. The hook enclosures move instantly to expose the hooks when a fish strikes the lure. The slightest touching of the enclosure walls by the fish as he strikes and bites the present lure causes the walls to collapse. With the present lure, a plural or ganged hook arrangement is possible and more than one hook can be exposed when a fish strikes the lure. If the striking fish happens to escape the exposed hooks, then the enclosure walls again extend to entirely cover the hook and prevent entanglement so that no reloading is necessary and the hook is always protected except when the lure is struck by a fish.

Accordingly, it is an object of the present invention to provide a new and improved fishing lure which will maintain itself free of weeds, algae and other material when in use.

Another object of the present invention is to provide a new and improved fishing lure wherein a protected hook is exposed instantaneously when the lure is struck by a fish.

Still another object of the present invention is to provide a new and improved fishing lure wherein a hook is protected and hidden during use of the lure except when struck by a fish in which event the hooks are readily exposed for catching the fish.

And yet another object of the present invention is to provide a new and improved fishing lure wherein a hook is hidden and protected from entanglement by a pair of thin resilient walls wherein the walls collapse readily when struck by a fish to expose the hook and re-extend themselves to protect the hook if the fish is not caught.

A final object of the present invention is to provide a new and improved weedless fishing lure which has a minimum number of parts, is simple in construction, and is economical of manufacture.

Other objects and a fuller understanding of the invention may be had by referring to the following description and claims taken in conjunction with the accompanying drawings in which:

FIGURE 1 is a side elevational view of the fishing lure of the present invention.

FIGURE 2 is a top plan view of the fishing lure of FIGURE 1.

FIGURE 3 is a cross sectional view taken along a longitudinal plane as indicated by the line 3—3 in FIGURE 2.

FIGURE 4 is a cross sectional view, taken in a plane perpendicular to the longitudinal axis of the lure, as indicated by the line 4—4 in FIGURE 1.

FIGURE 5 is an enlarged, fragmentary view in cross section taken in the same plane as FIGURE 4 of a hook enclosure of the present fishing lure.

FIGURE 6 is a front view of the fishing lure of FIGURE 1.

FIGURE 7 is a cross section view, taken along a longitudinal plane of the head of the fishing lure of FIGURE 1.

FIGURE 8 is a back view of the head of the present fishing lure.

FIGURE 9 is a cross sectional view of the tail of the fishing lure of FIGURE 1, taken in a plane perpendicular to the longitudinal axis of the lure, as indicated by the line 9—9 in FIGURE 3.

FIGURE 10 is an enlarged view similar to FIGURE 4 showing the present fishing lure when struck by a fish.

Referring now to the drawing, the fishing lure of the present invention is indicated generally by the reference character 10. The fishing lure 10 includes a head 11, a body 12, and a tail 13. The body 12 includes a treble fin member 14 and a hook member 15. The tail also includes a treble tail fin member 16 and a hook member 17.

The head 11 is made of a relatively solid material, for example wood, a hard synthetic plastic or the like. As shown in FIGURE 6, the head 11 has three fin-like head portions 18-20 projecting radially from a central core portion 21. The fin-like head portions 18-20 are in equi-angularly spaced relative positions around the core portion 21. The outermost edges of the fin-like head portions 18-20 taper in a curved manner from an extreme forward end or nose 22 of the head 11 to a back 23 of the head 11. The back of each of the projecting head portions 18-20 is cut away to provide a three pointed star cavity 24 for receiving a forward end of the fin member 14. A center bore 25 extends axially through the core portion 21 of the head 11 and forms a shank receiving opening.

The fin member 14 is preferably made of very resilient material and has a soft, pliable nature. Referring to FIGURES 1-5, the fin member 14 includes a solid longitudinally extending center core portion 30 and three fin-like hook enclosures 31-33. The hook enclosures 31-33 project radially from the solid core portion 30, are arranged in equi-angular relative positions, and extend longitudinally of the body 12.

Each hook enclosure comprises a pair of thin walls 35, 36 which are substantially parallel on their outside surfaces and have their inside surfaces spaced to define a hook receiving cavity 37 between them. The longitudinal ends of the thin walls 35, 36 are joined by forward and rearward end portions 38, 39 of the hook enclosures. The hook enclosures 31-33 each further include lip portions 40, 41 which extend longitudinally between the forward and rearward end portions 38, 39.

As shown in FIGURES 4 and 5, the thin enclosure side walls 35, 36 taper from the central core portion to very thin mid-wall sections 44, 45 approximately mid-way between the lip portions 40, 41 and the central core portion 30. The thin mid-wall sections 44, 45 extend the longitudinal length of the hook enclosures 38, 39. The thin walls 35, 36 further taper increasingly in cross section to the lip portions 40, 41 which are larger in cross section. The mid-wall sections are so thin that a sharp radial force exerted against the outside surfaces of the lip portions, as by a striking fish, will collapse the thin walls. The mid-wall sections 44, 45 are of sufficient thickness to maintain the thin walls projecting in their substantially parallel relation shown in FIGURE 4 and the lip portions 40, 41 in an abutting relation except when the lure is struck by a fish.

The lip portions 40, 41 in their abutting position define slit-like closeable openings 46-48 in the outermost portions of the hook enclosures 31-33. The lip portions 40, 41 each have recesses which together define a tip-receiving cavity 43 when the lip portions are in abutment. The hook member 15 comprises a central shank 50 and three hooks 51-53. The central shank 50 is an elongated rod having its ends formed into eyelets 54, 55. The hooks 51-53 are secured as by welding or the like, to the shank 50 approximately mid-way between the eyelets 54, 55. The three hooks 51-53 are disposed in equi-angular positions around the central shank 50 and form a treble hook member.

Referring to FIGURE 3, each of the hooks 51-53 has a curved portion 56 and a barbed tip 57. The curved portion 56 extends first rearwardly and outwardly along an innermost portion and then curves around to a forwardly and slightly upwardly extending outermost portion. The outermost portion of the hook includes the barbed tip 57 which extends forwardly and slightly upwardly.

The fin and hook members 14, 15 are preferably assembled by molding the body fin member 14 on the hook member 15. When the fin and hook members 14, 15 are assembled the shank 50 extends centrally through the core portion 30 of the treble fin member 14. The hooks 51-53 are enclosed between the hook enclosures 31-33. The eyelet 55 is disposed in a rear cavity 59 of the treble fin member 14. Each barbed tip 57 is disposed within its respective tip receiving cavity 43. The outermost surface of the barbed tips 57 generally parallels the streamlined outermost curved surfaces of the hook enclosures 31-33. The pairs of lip portions 40, 41 thus surround the barbed tips 57 of the hooks 51-53. The outermost surface of the hooks 51-53 lies just under the outermost surface of the hook enclosures 31-33 so that the barbed tips 57 are normally concealed and protected but are exposed the instant inward deformation of the hook enclosure walls 35, 36 takes place. The barbed tips are, therefore, in a position where they are normally just hidden by the lip portions 40, 41 but will immediately project through the lip portions when the lure is struck sharply, as by a striking fish.

Prior to assembly of the head 11, the forward end of the shank 50 is straight and is pushed through the shank receiving bore 25 in the head 11. The head 11 slides on the shank 50 until the head 11 abuts the treble fin member 14. The eyelet 54 is then formed in the end of the shank 50 to lock the head 11 to the body 12.

Substantially the entire connection between the head and fin members 14, 15 is by the shank 50 and the eyelet 54 so that the forward end 38 of the fin member 14 is free to flex downwardly away from the head 11. If desired, a suitable adhesive may be provided between the head 11 and the body 12 immediately around the shank 50 to further prevent longitudinal movement of the head 11 relative to the body 12. If additional weight is desired for the lure, a sleeve 58 of lead or other suitable material may be disposed around the shank 50 prior to assembly.

When the head 11 and the body 12 are assembled, the forward end portion 38 of the treble fin member 14 is disposed in the star cavity 24 in the back of the head 11. The forward end portion 38 as received in the cavity 24 locks the head 11 and the body 12 against relative rotation. The outer surfaces of the head portions 18-20 of the head 11 align and register with the outer surfaces of the hook enclosures 31-33.

The curved taper of the outermost edge of the head portions 18-20 matches the curved taper of the outermost edge surfaces of the hook enclosures 31-33. The lure 10 thus tapers sharply upwardly along the head portions 18-20 to the hook enclosures 31-33 and then gradually tapers off toward the rearward end of the fin member 14 to provide a stream-lined lure.

In the tail 13, the treble fin member 16 includes a central core portion 61 and a plurality of hook enclosures 62-64. The hook enclosures 62-64 project radially from the central core portion 61 and are disposed in relatively equi-angular positions. As shown by hook enclosure 62, the hook enclosures 62-64 each include a pair of thin walls 65, 66 extending in a generally parallel manner from the central core portion 61 to outer lip portions 67, 68. The thin walls 65, 66 taper to very thin mid-wall sections 69, 70 which are substantially identical to the enclosure walls 35, 36 of the enclosures 31-33. The lip portions 67, 68 are also substantially identical to the lip portions 40, 41 and include recesses which define a barbed tip receiving cavity 71. The fin member 16 includes a forward end portion 72 which connects the thin walls 65, 66. Each pair of thin walls 65, 66 are also connected at the outermost tip of the trailing ends of the hook enclosures 62-64 as by a fastener, a heat weld or other suitable securement means. The tip connections, indicated by the dots 81-83, serve to maintain the enclosure walls 65, 66 together in their standing normally fully extended position.

The treble hook member 17 includes a shank 75, an eyelet 76 at a forward end, and three hooks 77-79 projecting from a rearward end of the shank. Each of the hooks 77-79 curves around to a barbed tip 80 at their outermost and forwardmost ends.

The tail fin member 16 and the treble hook member 17 are preferably molded together so that the shank 75 extends centrally through the center core portion 61. The hooks 77-79 are enclosed within the hook enclosures 62-64. As shown in FIGURE 3 by the hook 77, an innermost portion of each hook extends first rearwardly and then curves around to the barbed tip 80 which tip extends forwardly. The barbed tip 80 is disposed within the tip receiving cavity 71 defined by the recesses in the lip portions 67, 68. The barbed tip 80 lies just under the outermost surface of the hook enclosure and will be exposed by any slight inward deformation of the enclosure. The tail 13 is connected to the body 12 during final assembly. The eyelet 76 and the forwardmost end of the tail 13 are disposed within the rear cavity 59 of the body 12 when the body and tail are assembled. The eyelets 55, 76 are interconnected and form a swivel connection between the tail 13 and the body 12.

Beads or other suitable substances are affixed to the head 11 near the juncture of the head portions 18-20 to form eyes 84-86. With the three eyes 84-86 located intermediate between each of the head portions, two eyes are always visible from any side of the lure.

The forward end portions 38 of the body 12 tend to maintain the lip portions 40, 41 closed and the thin hook enclosure walls 44, 45 in their standing positions against water pressures and submersed objects such as weeds and algae. The solid material of the head 11 protects the forward ends of the hook enclosures and prevents premature opening of the hook enclosures 31-33 by objects in the water other than a striking fish. Thus, even though the thin walls are extremely soft and easily deformed inwardly, the hooks will not be exposed by the fact that the lure is moving in the water or brushes by weeds or other materials in the water. The lure 10 thus remains "weedless" when in use. Hard materials in the water cause the lure to move aside and do not cause the enclosure walls to collapse. A fish biting the lure catches the lure in his mouth such that the lure cannot move away. The slightest touching of a fish biting the lure in this manner causes the enclosure walls to collapse thereby exposing the hooks as is shown in FIGURE 10.

Normally, a fish strikes only for an instant. The present lure with its tapered thin enclosure walls, collapses instantly upon contact by the fish to expose the hooks and catch the fish even though its bite is only for an instant. When the fish bites the body, the tail, or both, more than one hook is generally exposed.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A fishing lure comprising:
   (a) a body including a pair of thin softly resilient walls extending in substantially parallel relation from a core portion and longitudinally between forward and rearward ends of the body so as to define a hook receiving cavity between them;
   (b) a hook carried by said body, said hook including a curved hook portion projecting outwardly from said core portion and forwardly within the hook receiving cavity;
   (c) the outermost surface of the hook being spaced slightly just inside the outermost surface of the thin walls when the walls are in their normal extended position;
   (d) said body further including forward and rearward end portions joining the thin walls at the forward and rearward ends of the body to maintain the walls in their normal extended position; and,
   (e) said hook being substantially spaced from said forward and rearward end portions sufficiently to permit the thin walls to collapse without said hook engaging said end portions whereby a fish striking the body causes the thin walls to collapse around the hook and expose the hook.

2. The fishing lure of claim 1 wherein the thin walls each include a very thin mid-wall section being located intermediate longitudinal borders of the thin walls and extending substantially the longitudinal extent of the thin walls, the mid-wall section being of a predetermined minimum thickness so that the walls tend to collapse when unconnected at their longitudinal ends, and the end portions of the body maintaining said walls in their generally parallel relation protecting the hook.

3. The fishing lure of claim 2 wherein a head is connected to the forward end of the body to cover and protect the forward end portion of the body.

4. The fishing lure of claim 3 wherein the head member includes a cavity on the back of the head member for receiving parts of the forward end portion of the body.

5. The fishing lure of claim 4 wherein the thin walls include lip portions on the very outermost longitudinal edges of the thin walls, said lip portions being in abutment when the walls are in their standing generally parallel positions, the lip portions including recesses which together define a tip receiving cavity for snugly receiving a barbed tip on the end of the hook.

6. A fishing lure comprising:
   (a) a body having a pair of longitudinally extending thin resilient walls;
   (b) a hook carried by said body, said hook including a curved portion projecting outwardly and forwardly within said thin walls;
   (c) said hook including a barbed tip at its forwardmost end;
   (d) said thin walls including abutting lip portions snugly surrounding said barbed tip, each of said abutting lips having a recess which together define a tip receiving cavity when the lip portions are in an abutting relation.

(e) the outermost surface of the hook being spaced slightly just inside the outermost surface of the thin walls when the walls are in their normal extended position whereby slight collapsing of said walls causes said barbed tip to project through and beyond the lip portions.

7. The lure of claim 6 wherein said thin walls are spaced from the hook except for said lip portions, which lip portions snugly engage the barbed tip.

8. A fishing lure comprising:
(a) a body of soft, very pliable, plastic material;
(b) a hook member carried by said body, said hook member comprising:
   (i) a shank portion;
   (ii) a hook portion extending in a curved manner away from and forwardly of a core portion of said body member;
   (iii) a barbed tip on the outermost and forwardmost end of said hook portion;
(c) said body including:
   (i) substantially parallel thin wall portions extending away from said central portion, substantially parallel to a plane defined by said hook member, and on each side of said hook member, said thin wall portions further extending laterally beyond the outermost portions of said hook member so as to conceal said hook member; and,
   (ii) said thin wall portions tapering in cross section to a minimum thickness area adjacent to the curved portion of said hook member between said shank portion and said barbed tip whereby said thin walls readily give in the minimum thickness area so as to collapse and expose the outermost portion of the hook member when the body is struck by a fish.

9. A fishing lure having a body and a tail swivelably connected to the body, said tail comprising:
(a) a core portion having a plurality of radially extending hook enclosure extending therefrom;
(b) a plurality of hooks each connected to a shank portion carried by said core portion and each including a curved hook portion projecting outwardly and forwardly from the shank portion into one of said hook enclosures;
(c) each hook enclosure comprising:
   (i) a pair of thin resilient walls extending radially from the core portion and in parallel relation on each side of a hook for substantially the entire extent of the tail;
   (ii) said thin walls being connected at their forward ends by forward integral portions of the tail;
   (iii) the outermost edges of the thin walls diverging outwardly and rearwardly in a decreasing manner to define a streamlined fin;
   (iv) the walls including reduced thickness areas whereby the rearwardmost portions of the walls tend to collapse to expose the hook when unrestrained; and,
   (v) a fastener means being spaced from the hook and connecting together rearwardmost and outwardmost tips of the thin walls to maintain the thin walls in their substantially parallel relation and restrain them against collapsing.

10. The fishing lure of claim 1 wherein said thin walls extend longitudinally for substantially the entire longitudinal extent of the body.

References Cited by the Examiner
UNITED STATES PATENTS

| | | | |
|---|---|---|---|
| 1,993,018 | 3/1935 | Pfeilfe | 43—42.47 X |
| 2,191,244 | 2/1940 | Wise | 43—42.1 |
| 2,590,461 | 3/1952 | Rasch | 43—42.1 |
| 2,994,982 | 8/1961 | Murawski | 43—42.1 X |
| 3,025,628 | 3/1962 | Murawski | 43—42.1 X |

SAMUEL KOREN, *Primary Examiner.*

R. L. HOLLISTER, *Assistant Examiner.*